United States Patent [19]

Cameron

[11] Patent Number: 5,172,036
[45] Date of Patent: Dec. 15, 1992

[54] METHOD AND APPARATUS FOR RESYNCHRONIZING A MOVING ROTOR OF A POLYPHASE DC MOTOR

[75] Inventor: Scott W. Cameron, Phoenix, Ariz.

[73] Assignee: SGS-Thomson Microelectronics, Inc., Carrollton, Tex.

[21] Appl. No.: 773,725

[22] Filed: Oct. 9, 1991

[51] Int. Cl.[5] .............................................. H02P 6/02
[52] U.S. Cl. .................................................... 318/138
[58] Field of Search ..................... 318/138, 254, 695

[56] References Cited

U.S. PATENT DOCUMENTS

| | | | |
|---|---|---|---|
| 4,642,537 | 2/1987 | Young | 318/138 |
| 4,857,814 | 8/1989 | Duncan | 318/138 |

*Primary Examiner*—David Smith, Jr.
*Attorney, Agent, or Firm*—Richard A. Bachand; Lisa K. Jorgenson; Richard K. Robinson

[57] ABSTRACT

A circuit for resynchronizing the rotor of a polyphase dc motor having "Y" connected stator coils and a moving rotor has circuitry for determining the actual instantaneous position of the rotor, and circuitry for determining a desired rotor position precedent to executing a desired commutation sequence. Circuitry is provided for executing the desired commutation sequence when the circuit for determining the actual instantaneous position of the rotor detects that the rotor is actually in the desired rotor position, and circuitry is provided, responsive to a predetermined resynchronize signal such as an output enable signal, an overtemperature indicating signal, any other signal indicating abnormal operation condition of the motor or the driver circuit, or the like, (1) for inhibiting drive signals to the driving coils, (2) for initiating a resynchronizing routine to synchronize the position of the rotor to the desired commutation sequence, and (3) for reapplying drive signals to the coils after the position of the rotor of the motor has been synchronized with the desired commutation sequence.

17 Claims, 7 Drawing Sheets

METHOD AND APPARATUS FOR RESYNCHRONIZING A MOVING ROTOR OF A POLYPHASE DC MOTOR

BACKGROUND OF THE INVENTION

1. Field of the Invention

This invention relates to improvements in circuitry for driving polyphase motors, and more particularly to improvements in circuitry for driving polyphase dc motors, and still more particularly to methods and apparatus for resynchronizing a commutation sequencer of a motor driver to a spinning rotor of a polyphase dc motor using the zero voltage crossing information of non-selected, or floating, rotor coils.

2. Description of the Prior Art

Although the present invention pertains to polyphase dc motors, in general, it finds particular application in conjunction with three phase dc motors, particularly of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils connected in a "Y" configuration, although actually, a larger number of stator coils are usually employed with multiple motor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90°. In operation, the coils are energized in sequences in each of which a current path is established through two coils of the "Y", with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction in the coil which was included in the prior current path. In this manner, six commutation sequences are defined for each electrical cycle in a three phase motor.

In the past, during the operation of a such polyphase dc motor, it has been recognized that maintaining a known position of the rotor is an important concern. There have been various ways by which this was implemented. The most widely used way, for example, was to start the motor in a known position, then develop information related to the instantaneous or current position of the rotor. One source of such instantaneous position information was developed as a part of the commutation process, and involved identifying the floating coil, and monitoring its back emf, that is, the emf induced into the coil as it moves through the magnetic field provided by the stator.

When the voltage of the floating coil crossed zero (referred to in the art as "a zero crossing"), the position of the rotor was assumed to be known. Upon the occurrence of this event, the rotor coil commutation sequence was incremented to the next phase, and the process repeated. The assumption that the zero crossing accurately indicated the rotor position was generally if the motor was functioning properly, and nothing had occurred which would disturb its synchronization from its known startup position. However, in reality, events did occur which sometimes resulted in a loss of synchronization. Such loss of synchronization might occur, for example, if the rotation of the disk was interrupted by a physical bump, or by a sticking motor bearing, or by frictional losses in the disk carrier, and so on. And, once such loss of synchronization occurred, there was no recovery.

The possibility of loss of synchronization made the motors previously used vulnerable and delicate, and great care had to be taken to insure that the startup algorithms and running conditions were precisely controlled to avoid anything which might cause such out of synchronization condition to occur.

SUMMARY OF THE INVENTION

In light of the above, therefore, it is an object of the invention to provide an improved apparatus and method for resynchronizing drive signals of a motor driver circuit to a spinning rotor of a polyphase dc motor.

It is another object of the invention to provide an improved apparatus and method of the type described which is useful for driving three phase dc motors, particularly of the brushless, sensorless type which are used for rotating data media, such as found in computer related applications, including hard disk drives, CD ROM drives, floppy disks, and the like.

It is still another object of the invention to provide an improved apparatus and method which uses the zero crossing of the voltage of the floating coils, in conjunction with information indicating the direction of the crossing to remove any ambiguity in the detection of the position of the rotor.

It is still another object of the invention to provide an improved apparatus and method which enables recovery from a condition in which the rotor position has become out of synchronization with the sequencer of the rotor commutation circuit.

It is yet another object of the invention to provide an improved apparatus and method which provides means for preventing commutation and switching noise from creating false zero crossing in the detection of the position of the rotor.

These and other objects, features and advantages of the invention will be apparent to those skilled in the art from the following detailed description of the invention, when read in conjunction with the accompanying drawings and appended claims.

In accordance with a preferred embodiment of the invention, a circuit is presented for operating a polyphase dc motor of the type having a plurality of "Y" connected stator coils and a moving rotor has circuitry for determining the actual instantaneous position of the rotor, and circuitry for determining a desired rotor position precedent to executing a desired commutation sequence. Circuitry is provided for executing the desired commutation sequence when the circuit for determining the actual instantaneous position of the rotor detects that the rotor is actually in the desired rotor position, and circuitry is provided, responsive to a predetermined resynchronize signal for inhibiting drive signals to the driving coils, for initiating a resynchronizing routine to synchronize the position of the rotor to the desired commutation sequence, and for reapplying drive signals to the coils after the position of the rotor of the motor has been synchronized with the desired commutation sequence.

The circuitry for determining the actual instantaneous position of the rotor of the motor includes circuitry for receiving the back emf of at least one coil prior to the desired commutation sequence, and circuitry for determining when the back emf received by the circuitry for receiving the back emf crosses zero from a predetermined direction. Circuitry is provided for measuring a delay after the back emf crosses zero from the predetermined direction to initiate a commutation, and, in addition, to enable mask circuitry to inhibit the back emf circuitry from determining when the back emf received by the circuitry for receiving the back emf crosses zero for a predetermined time after the commutation.

The delay and mask circuitry has an up counter and first and second down counters, a source of clock pulses connected to clock the up and down counters, means to inhibit the clock pulses to the second down counter until the first down counter has reached a predetermined count, and means operative when the zero crossing detector detects a zero crossing to load a count from the up counter into the first and second down counters and then to reset the up counter. The first counter determines the delay period before commutation, and the second counter determines the noise masking period.

In response to a "resynchronize" signal, which may be an output enable signal, an overtemperature indicating signal, any other signal indicating abnormal operation condition of the motor or the driver circuit, or the like, a minimum delay count is loaded into the first down counter and a minimum mask count is loaded into the second down counter in place of the period count that is loaded under normal operating conditions. The minimum mask count produces a mask time of between about 500 nanoseconds and about 10 microseconds.

In accordance with another broad aspect of the invention, a method for operating a polyphase dc motor having a plurality of driving coils and a moving rotor is presented. The method includes the steps of determining the actual instantaneous position of the rotor, determining a desired rotor position precedent to executing a desired commutation sequence, and executing the desired commutation sequence when the circuit for determining the actual instantaneous position of the rotor detects that the rotor is actually in the desired rotor position. In response to a predetermined resynchronize signal, drive signals to the driving coils are inhibited, and a resynchronizing routine to synchronize the position of the rotor to the desired commutation sequence is initiated. After the position of the rotor of the motor has been synchronized with the desired co mutation sequence the drive signals are reapplied to the coils.

The step of determining the actual instantaneous position of the rotor of the motor is performed by providing circuitry for receiving the back emf of at least one coil prior to the desired commutation sequence and determining when the back emf received by the circuitry for receiving the back emf crosses zero from a predetermined direction. A delay is provided for a predetermined time after the back crosses zero after which a commutation is performed. When the commutation occurs, a mask is provided for inhibiting the step of determining when the back emf next crosses zero. In response to the resynchronize signal, the mask delay time is established that is significantly less than the mask time required for normal motor operation when drive signals are applied to the coils.

BRIEF DESCRIPTION OF THE DRAWINGS

The invention is illustrated in the accompanying drawings, in which:

FIG. 5a shows various voltage waveforms generated at the output of the zero crossing detector of FIG. 5, illustrating their timed relationship to a detected rising or falling zero crossing.

In the various figures of the drawing, like reference numerals are used to denote like or similar parts.

DETAILED DESCRIPTION OF THE PREFERRED EMBODIMENT

Figure 1:
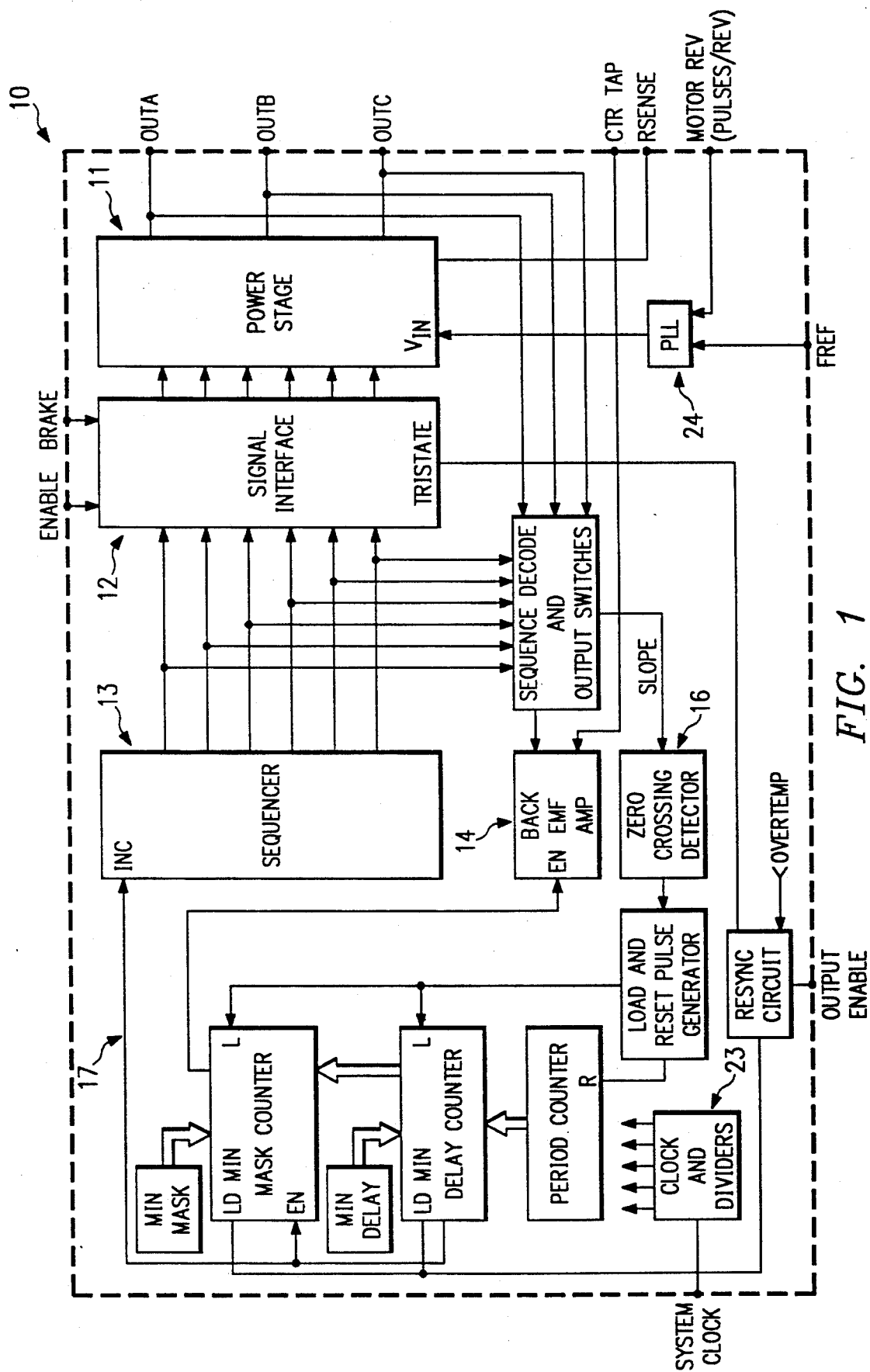
FIG. 1 is an electrical schematic block diagram of a motor driver system incorporating apparatus in accordance with a preferred embodiment of the invention.

A portion of an electrical schematic block diagram of a motor controller 10 in which the apparatus and method in accordance with a preferred embodiment of the invention may be incorporated is shown in FIG. 1. Although the motor controller can be constructed of discrete components, preferably, the motor controller 10 is integrated onto a single semiconductor chip adapted for connection to the stator coils of a three phase dc brushless spindle motor, for use, for example, to turn a magnetic or other disk in systems such as computer hard disk drives, cd-rom drives, floppy disk drives, and the like. Such 3 phase motor preferably has Y connected stator windings, although such Y configured winding connections are not essentially required. Thus, the windings can be connected to output terminals OUT A, OUT B, OUT C and CTR TAP, as below described in further detail. It should be noted that although a preferred embodiment of the invention is described with regard to a three phase motor, in particular, the principles of the invention can be equally advantageously applied to polyphase motors, in general.

The driving voltage is provided to the output terminals OUT A, OUT B, and OUT C by a power stage 11, which may be configured as described below with reference to FIG. 2. The power stage 11 is sequenced to provide sequential control output signals to the output terminals OUT A, OUT B, and OUT C by a sequencer circuit 13, described below with reference to FIG. 4, and a signal interface circuit 12 supplies the output signals from the sequencer circuit 13 to the power stage 11, as well as enabling other functions, such as brake and output enable functions. The sequencer 13 also provides drive signals to other circuits of the controller circuitry to control the various aspects of rotation of the motor driven by the circuit 10.

The output terminals OUT A, OUT B, and OUT C are also switchably connected to a back-emf sense amplifier 14, the details of which are described with reference to FIG. 5 below. The back-emf sense amplifier 14 in turn delivers signals to a zero crossing detector circuit 16, illustrated in FIG. 5 below, which provides input signals to a digital delay circuit 17, described in detail in FIG. 7 below. The output of the digital delay circuit 17 controls the operation of the sequencer 13, in a manner below described in detail. The motor controller circuitry 10 includes system clock circuitry 23, and phase lock loop (PLL) frequency/phase detector circuitry 24, and may include various other circuitry, not shown, such as circuitry to support pulse width modulation operation of the motor, "align and go" start up circuitry to facilitate start up of the motor from a stopped condition, port control logic and associated shift register circuitry to facilitate control of the motor controller circuitry by an external microprocessor (not shown), and so forth.

Figure 2:
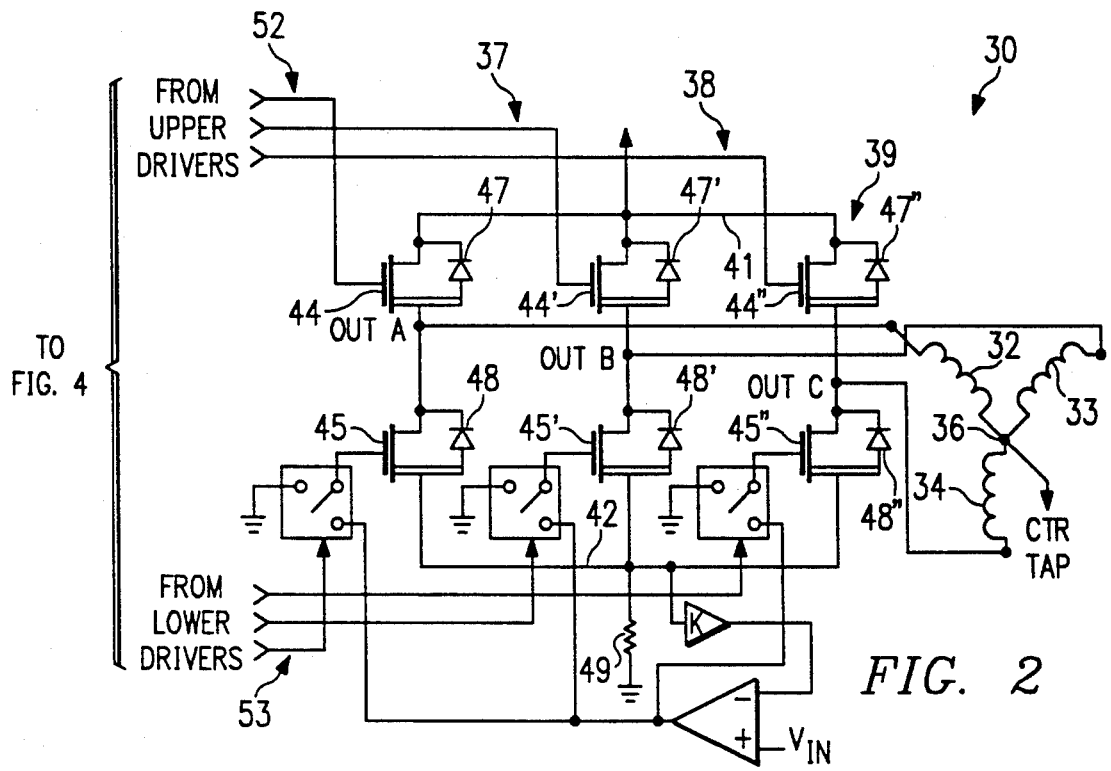
FIG. 2 is an electrical schematic diagram of the power stage used in the motor driver system of FIG. 1 for providing motor driving signals to the "Y" connected stator coils of the motor with which the driver system might be associated.

The power stage 11 of the motor control circuitry 10 is a conventional H-bridge 30, commonly referred to as a triple -½-H-bridge, as shown in FIG. 2. Also, the Y connected stator windings 32, 33, and 34 are shown in FIG. 2 connected to switchably receive the driving current delivered by the power stage 11 of the motor control circuitry 10. Three series current paths 37, 38, and 39 are provided between a supply voltage applied to a line 40, and a reference potential on line 42. Each current path includes, respectively, two switching transistors 44 and 45, 44' and 45', and 44" and 45". The transistors 44, 44', 44", 45, 45' and 45" can be of known power switch FETs, or other switch devices, as desired. The line 42 is connected to an external sense resistor 49 (externally connected to terminals R SENSE, as shown in FIG. 1), which in turn is connected to ground.

One end of each of the stator coils 32, 33, and 34 is connected together at a common center tap 36, the other ends being connected to respective nodes OUT A, OUT B, and OUT C between the respective pairs of switching transistors 44-45; 44'-45', and 44"-45". Each of the switching transistors 44, 45, 44,' 45', 44", and 45" has a flyback diode 47, 48; 47', 48'; and 47", 48" connected in parallel with its current path, as shown.

Figure 3:
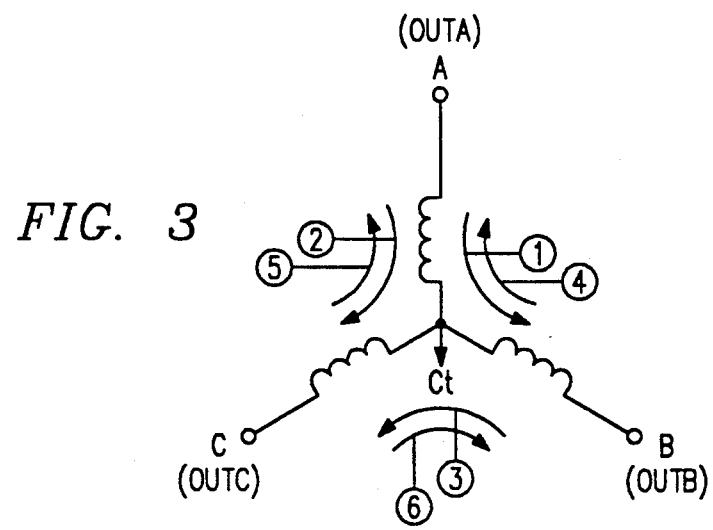
FIG. 3 is an electrical schematic diagram of a typical "Y" connected rotor coil arrangement, illustrating the current flow direction for 6 phases of a 3 phase motor.

In operation, during an energized phase, one node (for example, node out A) is driven high by one of the upper switches 44. One node (for example, node out B) is driven low by one of the lower switches 45', and the other node (for example, node C) is left floating with both switches 44" and 45" off. This is commonly to as the "AB phase". The coils are then switched in a commutation sequence determined by the sequence circuit 13 in a manner such that in each commutation phase current always flows in two of the three coils, with the third coil floating, and that after switching current will continue to flow, and in the same direction, in one of the two coils in which current was flowing in the previous phase. More particularly, as shown in the diagram of FIG. 3, in a three phase motor, actually six operational phases exist. The current flows in each of these six phases as shown in the following Table A:

TABLE A

| Phase | Current Flows From: | To: | Floating Coil: |
|---|---|---|---|
| 1 | A | B | C |
| 2 | A | C | B |
| 3 | B | C | A |
| 4 | B | A | C |
| 5 | C | A | B |
| 6 | C | B | A |

Figure 4:
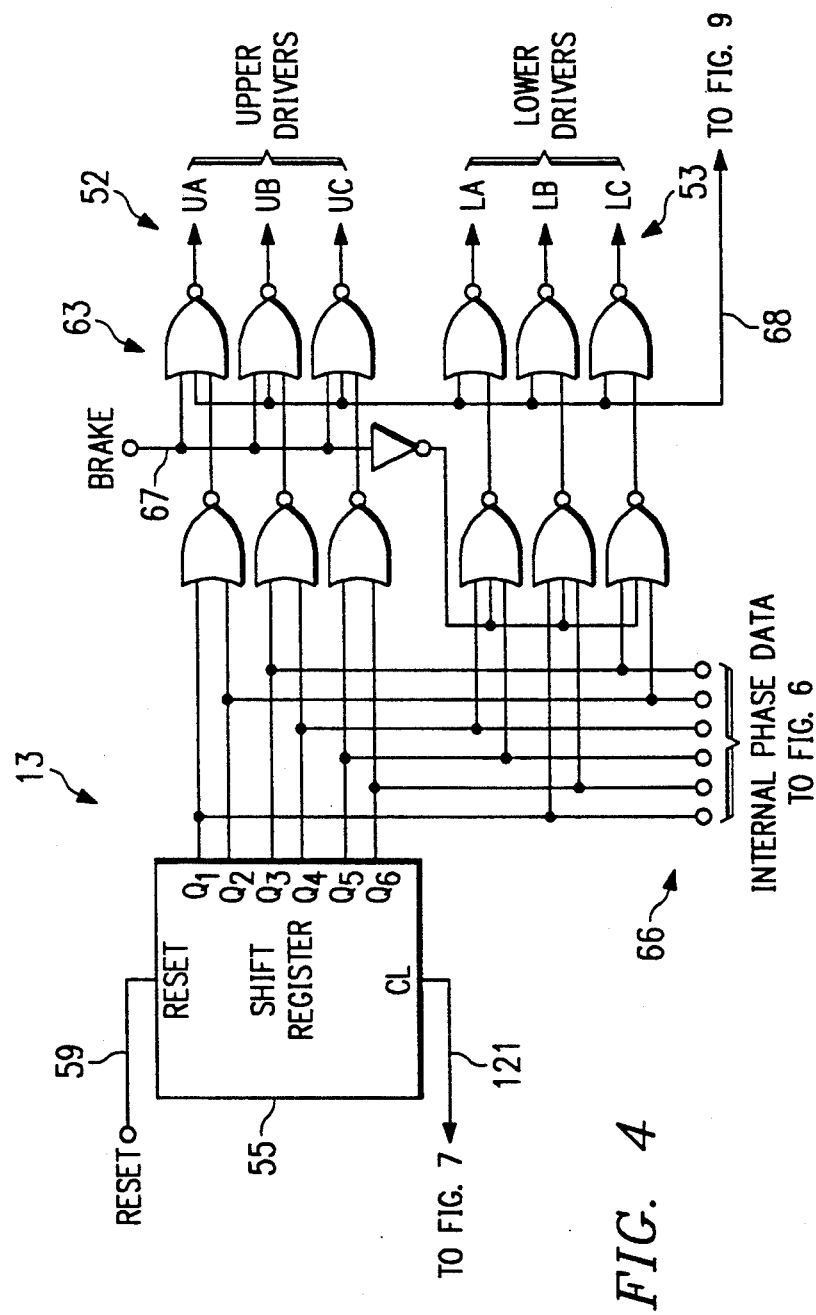
FIG. 4 is an electrical schematic diagram of a sequencer circuit used in the motor driver system of FIG. 1.

The switching of the driver transistors of the power stage 11 to effect the switching currents for each phase is accomplished by a sequencer circuit 13, as shown in FIG. 4, which provides signals to the upper driver outputs 52 and the lower driver outputs 53 to accomplish the switching sequence outlined above in Table A. The upper and lower driver outputs 52 and 53 are connected to the upper and lower driver input lines, shown in FIG. 2. A shift register 55 determines the specific upper and lower output lines which are activated any particular instant. To accomplish this determination, an appropriate sequence may be loaded into the shift register 55, and sequentially shifted through the various data positions of the shift register 55. For example, one data sequence in the embodiment shown which will produce the commutation sequence of Table A might be "110000", which will be continuously clocked to appear at the outputs $Q_1$-$Q_6$. The shift register 55 is clocked by a system clock, introduced into the shift register 55 by a clock signal produced by a delay counter 112, described in detail below with respect to FIG. 7. Thus, the shift register 55 operates to present a high state on one of its outputs $Q_1$-$Q_6$ to turn on the corresponding upper and lower transistors according to the sequence shown in Table A.

The other circuitry of the sequence circuit 13 includes a reset line 59 to operate to reset the shift register 55. The outputs $Q_1$-$Q_6$ are also connected via lines 66 to the zero voltage crossing logic control circuit of FIG. 6, described below. If desired, a brake and/or over-temperature indicating signals developed elsewhere in the motor control circuit 10 may be applied on line 67 to logic circuit 63 to prevent output to the motor on the upper and lower driver output lines 52 and 53 when such brake signal and/or over-temperature condition exist. The brake signal, which may be a software generated or external signal, is applied to turn on all the lower drivers, and to turn off all of the upper drivers. At the same time all of the coils 32, 33, and 34 are shorted together so that the eddy currents generated by the magnetic field in the coils 32, 33, and 34 brakes the motor.

The commutation among the coils 32, 33, and 34, unlike previous commutation techniques, is performed in response to information indicating the specific position of the rotor of the motor in conjunction with circuit information indicating the desired position of the rotor. More specifically, the commutation to apply the next drive sequence of Table A is determined in response to a corresponding coil reaching a particular rotational position and its correlation with sequencer information indicating where the motor should be when a commutation is to occur. The determination of the precise rotational location of the rotor is continuously being determined by monitoring the zero crossing voltage in each non-driven, or floating, coil. More particularly, as the coils 32, 33, and 34 are switched during the commutation sequence of the rotor, the voltage of the floating coil is monitored by the back emf amplifier circuit 14 shown in FIG. 5.

The back emf amplifier circuit 14 includes switches 81, 82, and 83 respectively connected to the motor driver outputs OUT A, OUT B, and OUT C, in the circuit of FIG. 2 to apply a selected one of outputs OUT A, OUT B, or OUT C to the non-inverting input of a comparator 85. The particular one of the motor driver outputs OUT A, OUT B or OUT C which is applied to the comparator 85 corresponds to whichever of coils 32, 33, or 34 is expected to be floating (not the coil which is actually floating). Although the term "floating" is used herein to indicate the coil which is not in the instantaneous current path, the coil does not actually "float", but is connected to a tristate impedance. The switches 81, 82, and 83 are operated by the circuit of FIG. 6, below described, to effect the switching of the coil expected to be floating, as just described.

The center tap connection 36 (see FIG. 2) of the rotor is connected to the inverting input of the comparator 85, so that when the voltage on the selected floating coil becomes larger than the center tap voltage, the comparator produces an output, representing the zero voltage crossing of the voltage on the selected floating coil. (The voltage which is applied to the input to the comparator 85 is the so-called "back emf" of the coil, the voltage generated in the selected coil as it moves through the magnetic field within the motor produced by the stator of the motor.) The comparator 85 is designed to have hysteresis, because the occurrence of a voltage beyond the zero crossing voltage may not last a sufficiently long time to enable the output signal of the comparator 85 to be useful.

Figure 5:
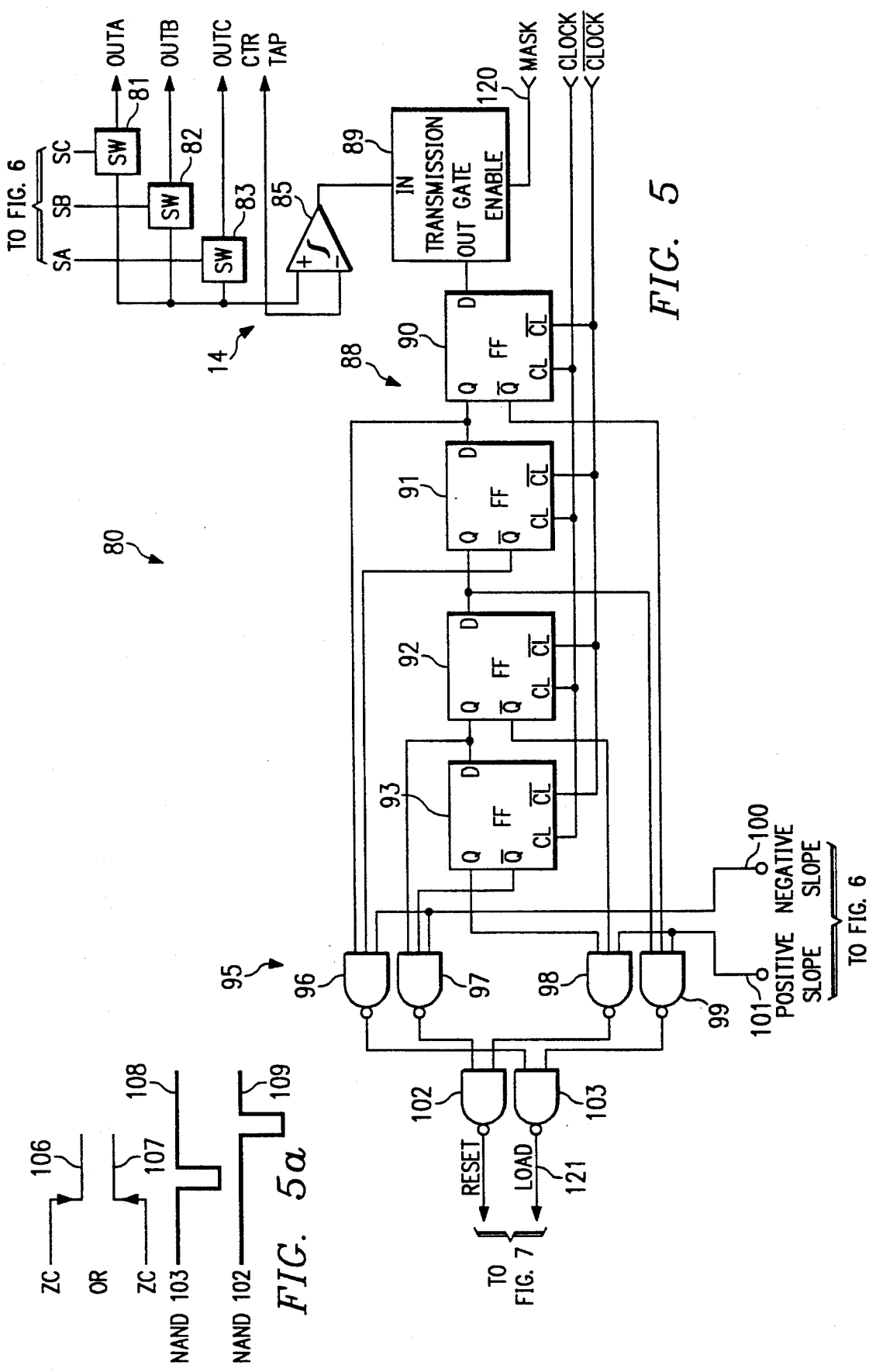
FIG. 5 is an electrical schematic diagram a back emf amplifier and zero crossing detector used in the motor driver system of FIG. 1.

With further reference to FIG. 5, the output from the comparator 85 is connected to a shift register 88 through a transmission gate 89. The mask signal generated by the mask counter 111 (see FIG. 7) is applied to an enable input of the transmission gate 89 so that the output from the comparator 85 is inhibited from being applied to the shift register 88 during the mask period following a phase commutation of the sequencer circuit 13. When, however, the output signal from the comparator 85 is enabled to pass the transmission gate 89, it is applied to the D input of the first of four D-type flip flops 90, 91, 92 and 93 comprising the shift register 88.

The various outputs of the flip flops 90, 91, 92, and 93 are connected to the output logic circuit 95, which includes NAND gates 96, 97, 98, and 99. Each of the flip flops 90, 91, 92, and 93 receive a clock input, for example from the system clock, and each produces an inverted (Q(bar)) and non-inverted (Q) output. The Q outputs of flip flops 90, 91, and 92 are applied to the D input of the respective next stage flip flops, and the Q output of the last stage flip flop 93, is connected to NAND gate 98 of the output logic circuit 95.

The Q outputs of the flip flops 90 and 92 are connected to inputs of the upper NAND gates 96 and 97, respectively, while the Q outputs of the flip flops 91 and 93 are connected to the inputs of the lower NAND gates 99 and 98, respectively. On the other hand, the Q(bar) outputs of flip flops 90 and 92 are connected to inputs of the lower NAND gates 99 and 98, respectively, while the Q(bar) outputs of flip flops 91 and 93 are connected to inputs of the upper NAND gates 96 and 97, respectively.

Also, expected slope line 100 corresponding to an expected negative-to-positive going zero crossing slope is connected to inputs of NAND gates 96 and 97, and expected slope line 101 corresponding to an expected positive-to-negative going zero crossing slope is connected to inputs of NAND gates 98 and 99. The signals on lines 100 and 101 which indicate the direction of the expected zero crossing is generated from the phase information developed in the circuit of FIG. 6, which in turn, is derived from the outputs of the shift register 55 in the sequencer circuit of FIG. 4.

Finally, the outputs from the logic circuit 95 are connected to the output NAND gates 102 and 103, the outputs of which being produced in response to the detection of an actual zero crossing of a specified floating coil, the zero crossing having a transition in a specified, expected direction, i.e., either a negative-to-positive going zero crossing transition or a positive-to-negative going zero crossing transition.

The connections to the output NAND gates 102 and 103 are established with the output of the upper NAND gate 96 and the lower NAND gate 99 connected to the inputs of the output NAND gate 103, and the output of the upper NAND gate 97 and the output of the lower NAND gate 98 connected to the inputs of the output NAND gate 102. The line 101 on which a signal would appear if a positive slope zero crossing is expected is connected to the inputs of the upper NAND gates 96 and 97, and the line 100 on which a signal would appear if a negative slope zero crossing is expected is connected to the inputs of the lower NAND gates 98 and 99. Thus, the upper NAND gates 96 and 97 are responsive the actual occurrence of an expected positive slope zero crossing and the lower NAND gates 98 and 99 are responsive to the actual occurrence of an expected negative slope zero crossing.

Because of the staged connections at the four stage shift register 88 for each of the positive and negative detection paths, the outputs from the output NAND gates 102 and 103 are two pulses, spaced in time, as shown in FIG. 5a by the curves 109 and 108, respectively, resulting from either a positive-to-negative zero crossing 106 or a negative-to-positive zero crossing 107. Thus, the pulse generated at the output of NAND gate 103 precedes the pulse generated at the output of NAND gate 102 by one clock cycle. The output of the NAND gate 103 is used to provide a "load" signal to the counters which measure the required mask and delay time after a phase commutation and the output of the NAND gate 102 is used to provide a "reset" signal to the period counter, as below described.

Figure 6:
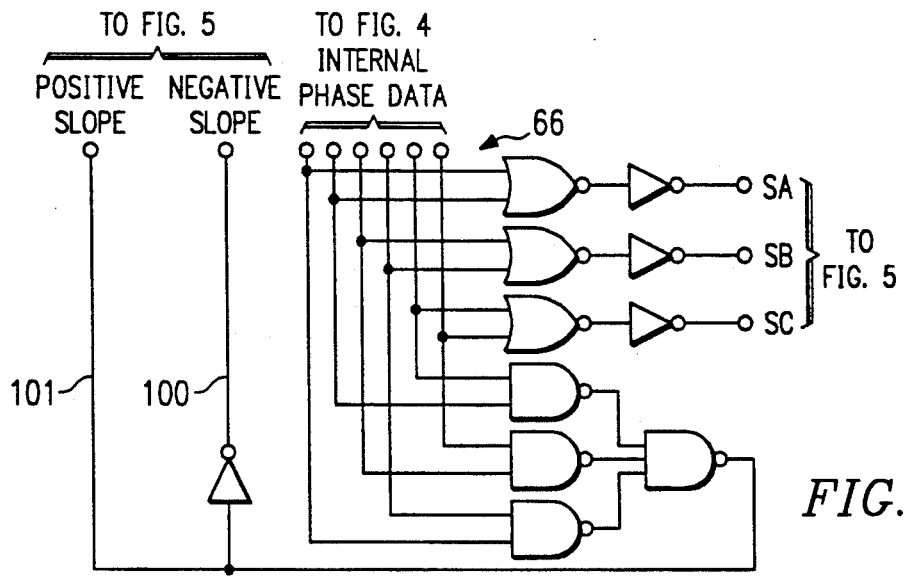
FIG. 6 is an electrical schematic diagram of a zero crossing logic switching circuit used to control the back emf amplifier connections in the circuit of FIG. 5.

The circuit for developing the switching signals for the switches 81, 82, and 83, as well as the negative and positive slope indicating signals on lines 100 and 101 is shown in FIG. 6, to which reference is now made. The circuit of FIG. 6 derives internal phase data on lines 66 from the output from the sequencer shift register 55 in FIG. 4. The lines 66 contain information respectively, from left to right indicating signals to upper and lower A, upper and lower B, and upper and lower C drive transistors (see FIG. 2). Thus, the output signal SA indicates that the coil at OUT A is expected to be floating, SB indicates the coil at OUT B is expected to be floating, and the output signal SC indicates the coil at OUT C is expected to be floating. The signals on lines 101 and 100 likewise, indicate whether the floating coil (that is, whichever may be instantaneously floating) is expected to experience a back emf zero crossing from the negative or positive direction.

Figure 7:
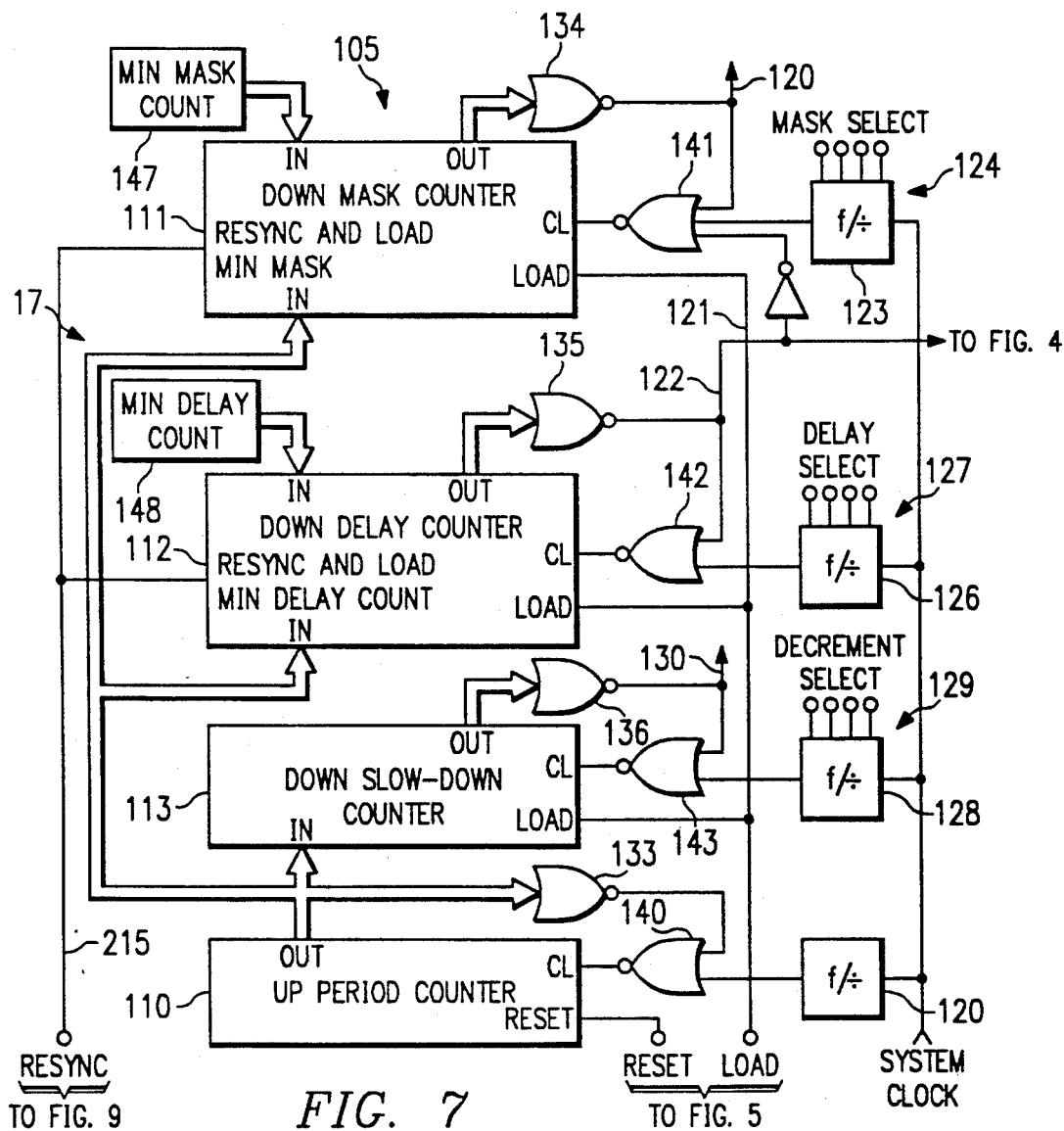
FIG. 7 is an electrical schematic diagram of a circuit for generating a commutation delay and sequencer advance signals, and a commutation noise mask for use in the motor driver system of FIG. 1.

In order to assist the back emf amplifier 14 and logic circuit 95 properly detect the zero crossing of the selected floating coil, it has been found necessary to mask noise generated in the operation of various circuit elements, especially noise generated by the commutation of the coils, which tend to ring, for some time after switching, and noise generated in the sequencer circuit. To accomplish this masking function, as well as other circuit functions enabled by the method of operation of the circuit of the invention, the delay and mask circuit 105 of FIG. 7 is provided. The delay and mask circuit 105 has an up counter 110, and three down counters 111, 112, and 113. The up counter 110 serves as a period counter to provide a digital count on its output corresponding to the time between actual zero crossings of the selected floating coil, detected by the zero crossing circuitry described above with reference to FIG. 5.

The up counter 110 receives a clock signal input from a clock frequency divider 120, which divides the system clock frequency to a desired frequency, the frequency selected determining the resolution of the system. The up counter 110 is reset by the reset pulse produced by the NAND gate 102 in the circuit of FIG. 5, after the actual occurrence of a desired zero crossing has been detected. Accordingly, the up counter 110 starts to count after being reset, and continues the count until being again reset upon the detection of the next actual zero crossing.

The output of the up counter 110 is connected to the inputs of each of the down counters 111, 112, and 113, which serve various mask, delay, and control functions. The down counter 111 determines a mask which serves to mask the noise of the sequencer circuit 13, shown in FIG. 4, as well as the noise produced by the coils 32, 33, and 34 in response to being commutated, to produce an output on line 120 when the desired mask count has been reached. The down counter 111 is hereafter referred to as the mask counter 111. The mask counter output signal on the line 120, for example, can be used to enable the transmission gate 89 in the zero crossing detector in FIG. 5, so that no zero crossing can be detected until after the expiration of the mask period. The mask counter 111 receives a "LOAD" signal from line 121, the "LOAD" signal being produced by the output of the NAND gate 103, shown in FIG. 5, just prior to the occurrence of the RESET pulse upon the output of the NAND gate 102.

Also, the mask counter 111 receives a clock signal from a frequency divider 123. If desired, a number of select terminals 124 may be provided enable the divisor of the frequency divider 123 to be controlled to allow the resolution of the mask count to be selected for a particular application in which the driver circuit 10 will be used.

Thus, in operation, when an actual zero crossing of a selected floating coil is detected by the circuitry of FIG. 5, the count which exists in the up counter 110 is loaded into the mask counter 111. The up counter 110 is reset to begin a new period count that will continue until the occurrence of the next zero crossing, at which time, the new count will be loaded into the mask counter 111, the up counter 110 reset, and the process repeated. It can therefore be seen that the actual mask time determined by the mask counter 111 will vary, depending upon the speed of rotation of the motor. (The percentage of the number of rotational degrees, however, will remain constant.)

In a similar fashion, the down counter 112 serves to count a time corresponding to a delay after the detection of a zero crossing before the coils are switched or commutated to the next phase. The down counter 112 is referred to hereafter as the delay counter 112. The delay counter 112 receives a divided clock frequency from a frequency divider 126, the divisor of which may be selected by applying an appropriate signal to one of the select lines 127. The operation of the load and count functions are essentially the same as the operation of the mask counter 111 above described. However, it is noted that the time calculated by the delay counter 112 indicated by the output on line 122 may be substantially longer than the time calculated by the mask counter 111.

The inverted output of the delay counter 112 on the line 122 is applied to the clock input of the mask counter 111 by a NAND gate 141 to which the clock pulses from the frequency divider 123 are also applied. Thus, the signal on the line 122 inhibits the application of the clock pulses to the mask counter 111 until after the completion of the delay count by the delay counter 112. The counts of the mask counter and the delay counter 112 are therefore sequential, with the mask count of the mask counter 111 following the completion of the delay count of the delay counter 112.

Because the mask circuitry 105 of FIG. 7 operates on the actual, not expected, zero crossing signals of the floating rotor coils, it enables many motor control functions which have been heretofore not possible to achieve. For example, the rotor commutation can be based upon a delay calculated after an actual zero crossing of an anticipated floating coil occurs. Thus, for example, the output of the delay counter 112 on the output line 122 is used to initiate a coil commutation. Then, since the mask counter 111 is also dependent upon the delay counter output signal to begin its count, the switching noise from the sequencer circuit 13 and switching transients produced by the coils can be masked, so that spurious zero crossings caused by switching noise will not be interpreted as an actual zero crossing of the selected floating coil.

In addition, other motor control functions can easily be achieved. For example, additional down counters, such as the down counter 113 mentioned above can provide useful functions, such as a speed slow-down determination. The down counter 113 is referred to hereafter as the slow-down counter 113. The slow-down counter 113 operates in the same way as the mask counter 111 and delay counter 112, receiving a clock signal divided in frequency from the system clock frequency by a frequency divider 128. If desired, select input lines 129 may be provided to allow the frequency divisor to be selected for particular motor driver applications. By appropriately selecting the clock frequency applied to the slow-down counter 112 so that the down count will be longer than the time between actual zero crossings of the commutated floating coils, if the output signal on line 130 changes states, indicating that the slow-down counter 113 has completed its count, the signal can be used as in indication that the motor is slowing down. That is, the appearance of a signal on the output line 130 indicates that the period counted is greater than the previous period which was loaded into the counter, indicating that the motor is slowing down.

For all of the counters 110, 111, 112, and 113, NAND gates 133, 134, 135, and 136 are provided to which the outputs of the respective counters are combined, to provide an output which is combined with the respective clock signals by NAND gates 140, 141, 142, and 143. Thus, the count of any of the counters 110, 111, 112, or 113 is allowed only to reach its maximum up or down count, and its count is stopped so that the counter will not recycle and begin a new count.

To enable the circuit of FIG. 7 to resynchronize to a spinning motor which may have become unsynchronized with the phase sequencer described with respect to FIG. 4 above, a circuit 147 providing a minimum mask count and a circuit 148 providing a minimum delay count to the mask counter 111 and the delay counter 112 are provided. Additionally, the mask counter 111 and the delay counter 112 receive a "resync" signal on the line 215, developed from the resynchronization circuit 210, described below with respect to FIG. 9. The mask counter 111 and the delay counter 112 operate in the presence of the resync signal on line 215 to load the minimum mask count contained in the minimum mask count circuit 147 and to load the minimum delay count in the minimum delay count circuit 148, respectively into the mask counter 111 and delay counter 112 instead of the contents of the period counter 110, in contrast to the normal operation of the delay circuit 17.

Figure 8:
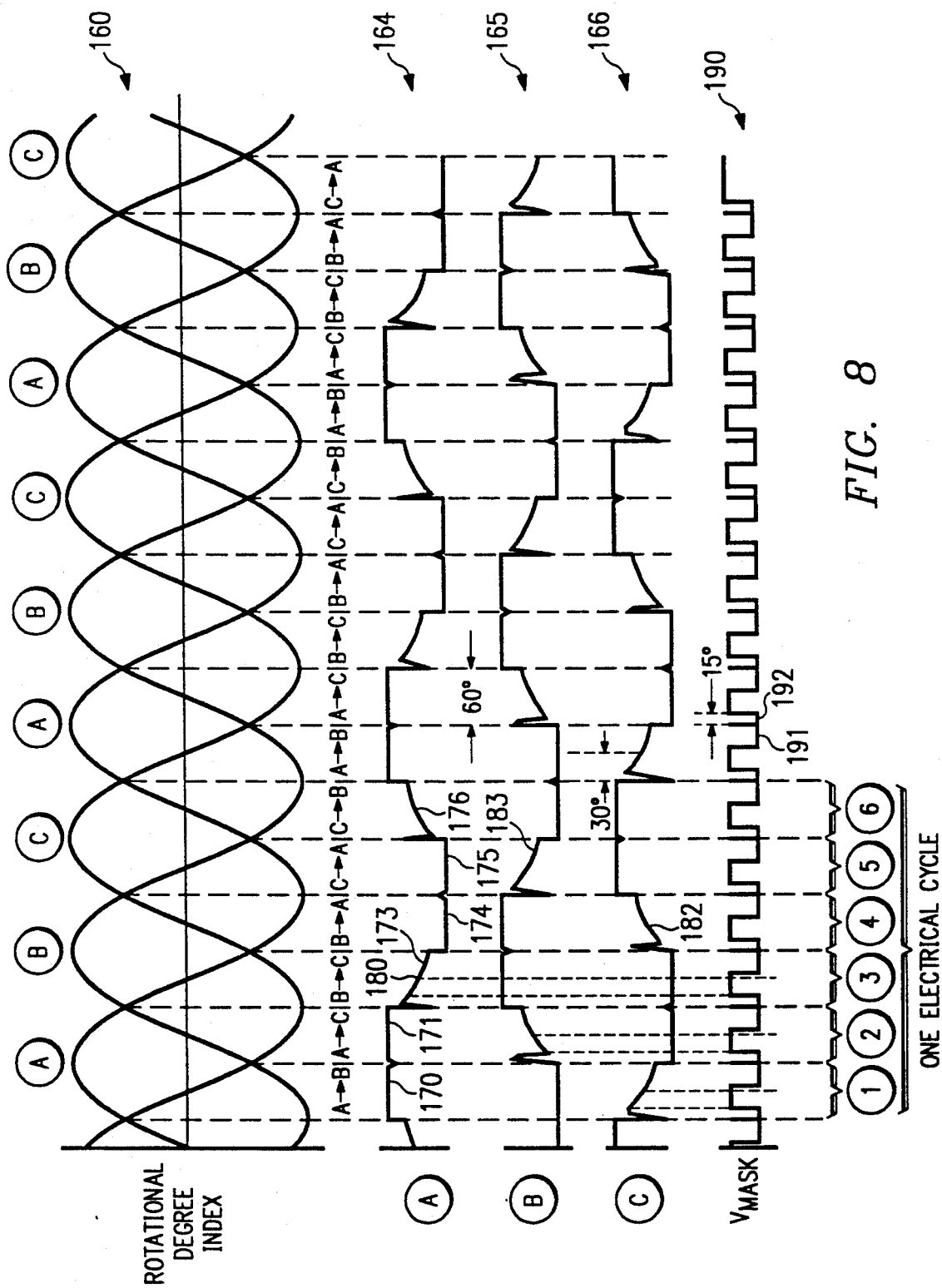
FIG. 8 are electrical waveforms showing the voltage signals at various points in the circuit of FIG. 1 with respect to several electrical cycles of the motor with which the driver circuit may be associated.

The operation of the circuit 10 will now be described, with reference to the waveforms which are developed in the various parts of the circuit, as shown in FIG. 8. The rotational degree index curves 160 for each coil are shown across the top of the waveforms for reference. Each sinusoidal waveform is labeled to correspond to the node to which each of the coils is connected: coil 32-A, coil 33-B, and coil 34-C. Beneath the rotational degree curves 160 is the corresponding commutation sequence which occurs at the specified rotational position.

The next three curves 164, 165, and 166 show the voltages of the respective driven coils A, B, and C. It can be seen that for one electrical cycle, indicated at the bottom of the curves of FIG. 8, each coil will have two sequences in which it has positive voltage, two sequences in which it has negative voltage, and two sequences during which it floats. For example, referring to the curves representing the voltage on coil A, the first two voltages 170 and 171 of sequences 1 and 2 during which current flows respectively from coil A to coil B, and from coil A to coil C, are positive. During the time coil A floats in sequence 3 the voltage 173 changes from positive to negative. The next two voltages 174 and 175 of sequences 4 and 5 during which current flows respectively from coil B to coil A, and from coil C to coil A, are negative. Finally, when coil A again floats during sequence 6, the voltage 176 changes from negative to positive. The other coils B and C have similar voltage curves, each displaced 120° from each other.

It can be seen that each coil floats twice during one electrical cycle, and has two zero crossings; however, one zero crossing has a negative slope, from positive to negative, and the other has a positive slope, from negative to positive. Thus, an ambiguity would exist if the rotor position were to be determined solely on the basis of a zero crossing without regard to the direction of the crossing. (This was one of the shortcomings of previous motor driver systems.) Thus, when the voltage, for example, of coil A transitions from positive to negative, shown by curve 173, a zero crossing 180 is detected by the zero crossing circuit 80, shown in FIG. 5. Moreover, the direction of the crossing also is detected by the slope detecting circuitry 95, also shown in FIG. 5. Once the zero crossing has been detected, the sequences is incremented, commutating the coils, the mask circuit 105 of FIG. 7 is reset and reloaded, as above described. The zero crossing detector then begins to look for the zero crossing of the next floating coil; in this case of coil C, which will be transitioning from negative to positive, as can be seen from the curve 182 in FIG. 8. After its zero crossing is detected and commutation performed, the positive to negative zero crossing of floating coil B, shown by the curve 183 is sought, and so forth.

In summary, the commutation sequence is as follows: the sequencer circuit establishes a desired rotor phase, and the zero crossing detector detects the occurrence by finding the proper zero crossing. When the zero crossing is detected, first a delay mask is generated by the delay counter 112, then the rotor coils are commutated, and a second mask is generated by the mask counter 111. The correct floating coil is determined by the phase information being generated from the output signals of the shift register 55, and the phase information connects the proper coil to the back emf amplifier 85 by closing the proper switch 81, 82, or 83.

By creating the delay between the zero crossing and incrementing to the next phase, the torque ripple can be optimized, thereby taking advantage of the inertia of the rotor.

It can be seen that throughout the process, two key elements exist: 1) the anticipated zero crossing is first established and 2) the actual zero crossing detected which corresponds to the previously established anticipated zero crossing. If the actual zero crossing is not detected, no commutation occurs until the zero crossing is in fact detected. Thus, the sequencer 13 is always synchronized to the actual motor position, even if the drive signals to the motor are removed. For example, if the driver circuit 10 includes an overtemperature warning signal, a circuit can be provided to block the drive signals to the motor until the overtemperature condition is corrected. When the drive signals are blocked, of course the motor will slow down, but the sequencer will nevertheless remain synchronized to the motor rotation, so that when the overtemperature condition is corrected, drive can be immediately reapplied to bring the motor back up to operating speed without elaborate resynchronizing techniques. The same is true of other events which would otherwise cause the motor to lose synchronization with the sequencer, such as a bump to the disk driven by the motor, or the like.

Finally, the mask signal 190 which would be produced on the line 120 of the mask circuit of FIG. 7 is shown in the bottom curves of FIG. 8. The mask curve has two portions, for example 191 and 192, corresponding to the mask times of the delay counter 112 and the mask counter 111, respectively.

As mentioned above, various conditions exist in response to which it is desired to remove the drive to the rotor of the motor, without actually braking the motor.

For example, the motor driver may receive an enable signal from an associated microprocessor or other external source. Also, various internally generated signals indicating abnormal operation, such as an overtemperature of the driver chip, the occurrence of an event which has disturbed the synchronization of the rotor and phase sequencer, or other such abnormal condition may be provided. In the event such condition occurs, the synchronization of the rotor with the synchronizer will have been lost, and heretofore, resort would have to be had to complicated restart and/or resynchronization algorithms.

Figure 9:
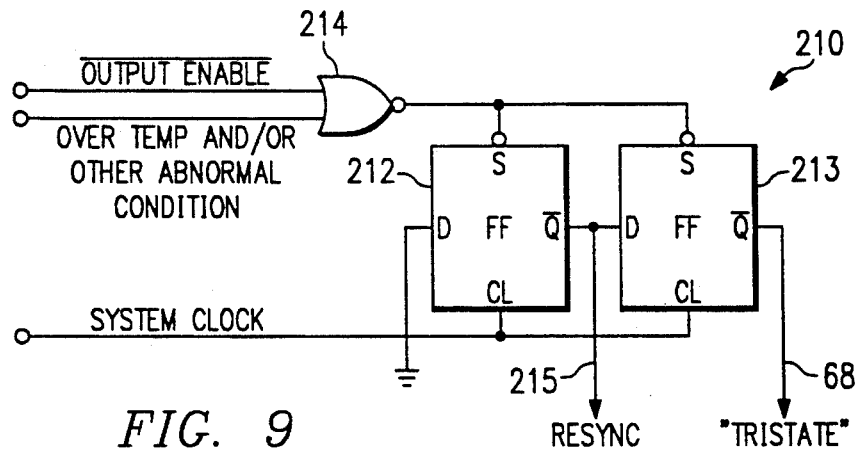
FIG. 9 is an electrical schematic diagram of a circuit for initiating and maintaining the resynchronization algorithm in conjunction with the mask generating circuitry of FIG. 7.

According to a preferred embodiment of the present invention, circuity for easily restoring synchronization is provided, a portion of the circuitry 210 being illustrated in FIG. 9. As shown in FIG. 9, the circuitry 210 includes a shift register having two flip-flops 212 and 213, each clocked, for example by the system clock. The flip-flops 212 and 213 are of the type which produce the complement of the data on the D input at the Q(bar) output after a clock pulse, if the signal on the S input is low. However, if the S input is high, the output on the Q(bar) output is low. Thus, normally, the output enable(bar) signal and the abnormal condition indicating signal are low, so the output from the NAND gate 214 is normally high. Normally, therefore, the Q(bar) outputs of the flip flops 212 and 213 are low. On the other hand, when any of the abnormal operating conditions occur or the output enable signal is removed, the flip flops 212 and 213 change state, applying a high signal on their Q(bar) outputs, the output on line 215 from the flip-flop 212 requiring that the resynchronization routine be immediately performed and the output on line 68 from the flip-flop 212 requiring that the coils of the motor be tristated.

When the output enable signal is restored, or the abnormal condition is removed, the low state applied to the D input of the flip-flop 212 is clocked through the circuit 210 in two clock cycles, first removing the resync signal to begin restoring normal circuit operation, then removing the tristate signal, allowing normal drive to be reapplied to the coils of the motor.

Figure 10:
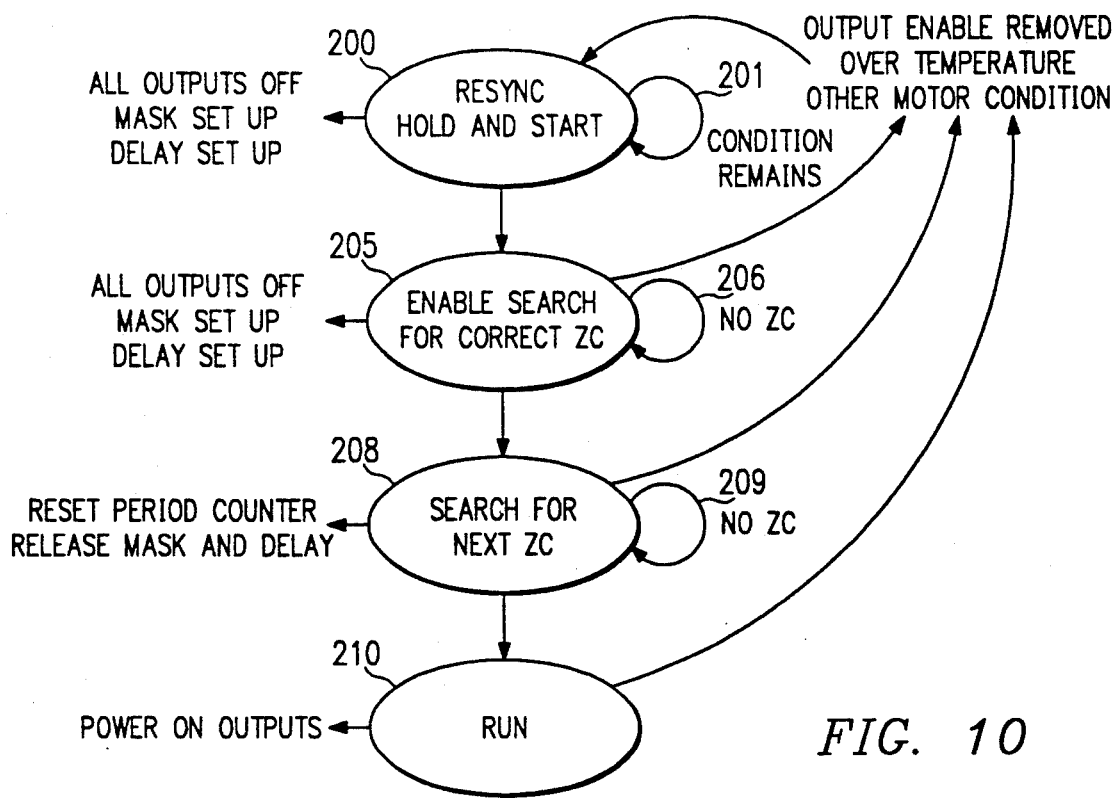
FIG. 10 is a state diagram illustrating the method by which the apparatus of FIG. 1 resynchronizes the drive signals of said apparatus with a spinning rotor of an associated polyphase dc motor.

The operation of the circuit in response to the resync and tristate signals of the circuit 210 is explained with reference now to the state diagram of FIG. 10. Upon the occurrence of a signal causing the resynchronization routine to be performed, a first state 200 is entered, and, as indicated by the loop 201, the first state 200 continues until the condition causing the resynchronization to be entered no longer remains. In the first state 200, all of the motor outputs are turned off, and the motor is allowed to coast. It is noted that this condition is different from the brake function described above in which the lower drive signals were turned on, allowing the back emf of the coils to stop the rotation of the rotor. At the same time, predetermined minimum mask and delay counts are loaded into the mask counter 111 and delay counter 112 (see FIG. 7).

Whenever the condition causing the initiation of the resynchronization algorithm is removed, the circuit is allowed to move to the second state 205. In the second state 205, the outputs stay tristated and the motor still coasts.

With reference once again to FIG. 7, with all of the coils off and floating, it can be seen that the mask counter 111, which normally generates a delay time for masking switching transients in the sequencer and back emf amplifier, and by the reaction of the coils to the commutation, is not as significant as it is under normal operation, since there are virtually no coil commutation transients when the coils are tristated, and only switching noise of the circuit itself needs to be masked. The time of the switching noise is considerably less than the commutation noise (for example 500 nanoseconds, compared to about 20 microseconds); consequently, only a "minimum mask" needs to be established during such tristate operation. However, it is noted that the phase information being detected by the back emf amplifier is still being used to select the correct floating coil and the correct rising or falling edge transition in the manner described above. Moreover, a predetermined delay is set up in the delay counter 112, corresponding to a desired delay before commutation occurs, in a similar manner to that above described for normal operation.

Consequently, in the second state 205, the circuit looks for a particular zero crossing, and if it occurs, a zero crossing signal is generated. If it does not occur, no zero crossing signal will be generated, and the circuit will remain in the second state 205, as indicated by the loop 206. The rotor, therefore, continues to rotate, without power, until the selected coil comes by the desired location, i.e., the location at which its zero crossing from the correct direction occurs. When the selected coil in fact reaches the desired location, and the zero crossing which was sought is detected, the commutation sequence is incremented to the next phase, and the state of the circuit changes to the third state 208. On the other hand, if not zero crossing is detected, the rotor will continue to coast, until it finally comes to rest. In this event, the motor will need to be restarted using one of many known motor startup algorithms.

When the zero crossing has been detected in the second state 205, and the circuit is in the third state 208. In the third state 208, the period counter 110 is immediately reset, and the second zero crossing is sought. The phase information from the sequencer circuit controls the back emf amplifier to look for the zero crossing of the next coming coil corresponding to the next phase. The search for the second zero crossing may be initiated as soon as the switching noise from the back emf amplifier and active circuitry is over, a time on the order of about 500 nanoseconds, since the coils are not yet energized, and do not contribute significant noise which may interfere with the zero crossing detection. Thus, for example a mask time between 500 nanoseconds and several milliseconds, preferably 5 to 10 milliseconds, is a suitable mask time. In a similar manner to that described above with respect to the second state 205, if the second zero crossing is not detected, the rotor will continue to spin, indicated by the loop 209, until the rotor finally comes to rest, and a start up algorithm is necessary to restart the motor.

However, once the second zero crossing is detected, a time base exists from which the actual rotational speed of the motor can be determined from the count which has accumulated in the period counter 110. Thus, upon the detection of the second zero crossing, the count which has accumulated in the period counter 110 is loaded into the mask counter 111 and the delay counter 112, the minimum mask count and minimum delay count load signals are released, and the circuit operation continues as under normal operation, in the fourth state 210.

It is noted that during resynchronization it is very likely that the rotor will have lost some rotational speed. Nevertheless, because the drive to the motor coils is synchronized by the actual rotor position, the drive will be properly synchronized, and the rotor speed will be correctly brought back to the proper operating speed, locked to the phase lock loop circuit 24, shown in FIG. 1.

Although the invention has been described and illustrated with a certain degree of particularity, it is understood that the present disclosure has been made by way of example only, and that numerous changes in the combination and arrangements of parts and features can be made by those skilled in the art without departing from the spirit and scope of the invention, as hereinafter claimed.

I claim:

1. A circuit for operating a polyphase dc motor having a plurality of driving coils and a moving rotor, comprising:
    first circuitry for determining when the back emf of at least one floating coil crosses zero from a predetermined direction for determining the actual instantaneous position of said rotor;
    second circuitry for determining a desired rotor position precedent to executing a desired commutation sequence;
    third circuitry for executing said desired commutation sequence when said first circuitry detects that the rotor is actually in the desired rotor position;
    fourth circuitry responsive to a resynchronize signal for inhibiting drive signals from application to said driving coils, for initiating a resynchronizing routine to synchronize the position of the rotor to said desired commutation sequence, and for reapplying drive signals to said coils after the position of the rotor of the motor has been synchronized with said desired commutation sequence;
    and mask circuitry for inhibiting said first circuitry for a predetermined fixed time after execution of each commutation sequence while said drive signals are being inhibited from application to said driving coils.

2. The circuit for operating a polyphase dc motor of claim 1 wherein said mask circuitry comprises;
    an up counter and first and second down counters,
    a source of clock pulses connected to clock said up and down counters;
    means to inhibit said clock pulses to said second down counter until said first down counter has reached a predetermined count;
    means operative when said zero crossing detector detects a zero crossing to load a count from said up counter into said first and second down counters and then to reset said up counter;
    whereby said first counter determines a commutation delay period and said second counter determines a mask period.

3. The circuit for operating a polyphase dc motor of claim 2 further comprising advancing circuitry response to said first down counter reaching said predetermined count for advancing said second circuitry precedent to executing a desired commutation sequence to advance to another desired rotor position precedent to executing another desired commutation sequence.

4. The circuit for operating a polyphase dc motor of claim 3 further comprising means operative in response to said resynchronize signal for loading a minimum delay count into said first down counter and for loading a minimum mask count into said second down counter in place of said period count.

5. The circuit for operating a polyphase dc motor of claim 4 wherein said minimum mask count produces a mask time of between about 500 nanoseconds and about 10 microseconds.

6. The circuit for operating a polyphase dc motor of claim 1 wherein said resynchronize signal is an output enable signal.

7. The circuit for operating a polyphase dc motor of claim 1 wherein said resynchronize signal is an over-temperature indicating signal.

8. A circuit for operating a three phase dc brushless, sensorless motor having a plurality of driving coils and a moving rotor, comprising:
    a sequencer circuit for producing commutation signal sequences for energizing said driving coils;
    a selection circuit for determining which of said plurality of driving coils would not be energized for each commutation signal sequence;
    a back emf amplifier;
    a circuit for connecting to said back emf amplifier said driving coils as said driving coils are determined by said selection circuit to not be energized by a current commutation signal sequence;
    a circuit for detecting when an output of said back emf amplifier crosses zero from a voltage direction determined by said current commutation signal sequence;
    circuitry responsive to a resynchronization signal for inhibiting drive signals from application to said driving coils and for synchronizing the position of the moving rotor to said commutation signal sequence;
    circuitry for energizing said driving coils in accordance with said commutation signal sequences after the position of said rotor has been synchronized therewith;
    and mask circuitry for inhibiting said circuitry for determining when the back emf crosses zero for a predetermined fixed time after a commutation of said coils while said drive signals are inhibited from application to said driving coils.

9. The circuit of claim 8 wherein said circuitry responsive to a resynchronization signal for inhibiting drive signals to said driving coils and for synchronizing the position of the moving rotor to said commutation signal sequence comprises:
    a shift register having first and second stages;
    a clock connected to clock data in said shift register;
    said shift register having outputs from said first and second stages allow a normal motor operation when said synchronize signal is in a first state;
    said shift register being connected, in response to a change in state by said synchronize signal, to produce an output from said first stage to remove drive signals from said coils and to produce an output from said second stage to initiate a resynchronization sequence;
    said shift register also being connected, in response to a return by said synchronize signal to said first state, to produce a signal from said second stage during a first clock cycle to complete said resynchronization sequence signal, and to produce a signal from said first stage during a subsequent clock cycle to restore drive signals to said coils.

10. The circuit claim 9 wherein said resynchronize signal is an output enable signal.

11. The circuit of claim 9 wherein said resynchronize signal is an overtemperature indicating signal.

12. The circuit claim 8 wherein said mask circuitry comprises:
an up counter and first and second down counters,
a source of clock pulses connected to clock said up and down counters;
means to inhibit said clock pulses to said second down counter until said first down counter has reached a predetermined count;
means operative when said zero crossing detector detects a zero crossing to load a count from said up counter into said first and second down counters and then to reset said up counter;
whereby said first counter determines a delay period after a zero crossing is detected before a coil commutation and said second counter determines a mask period to mask commutation noise.

13. The circuit of claim 12 further comprising circuitry responsive to said first down counter reaching said predetermined count for advancing said circuitry for determining a desired rotor position precedent to executing a desired commutation sequence.

14. The circuit claim 13 further comprising means operative in response to said resynchronize signal for loading a minimum delay count into said first down counter and for loading a minimum mask count into said second down counter in place of said period count.

15. The circuit of claim 14 wherein said minimum mask count produces a mask time of between about 500 nanoseconds and about 10 microseconds.

16. A method for operating a polyphase dc motor having a plurality of driving coils and a moving rotor, comprising:
determining the actual instantaneous position of said rotor by determining when the back emf of at least one floating coil crosses zero from a predetermined direction;
determining a desired rotor position precedent to executing a desired commutation sequence;
executing said desired commutation sequence when said the actual instantaneous position of the rotor is determined to be actually in the desired rotor position; and
in response to a resynchronize signal;
inhibiting drive signals to said driving coils;
creating a mask for a predetermined fixed time after a coil commutation for inhibiting said step of determining when the back emf next crosses zero while said drive signals are inhibited from application to said driving coils;
initiating a resynchronizing routine to synchronize the position of the rotor to said desired commutation sequence;
and reapplying drive signals to said coils after the position of the rotor of the motor has been synchronized with said desired commutation sequence.

17. The method of claim 16 further comprising, in response to said resynchronize signal, establishing a mask delay time of significantly less time than the mask time required for motor operation when drive signals are applied to said coils.

* * * * *

UNITED STATES PATENT AND TRADEMARK OFFICE
CERTIFICATE OF CORRECTION

PATENT NO. : 5,172,036

DATED : December 15, 1992

INVENTOR(S) : Scott W. Cameron; Mark E. Rohrbaugh; Francesco Carobolante

It is certified that error appears in the above-identified patent and that said Letters Patent is hereby corrected as shown below:

ON TITLE PAGE: Item [75] Inventors: Add

-- Mark E. Rohrbaugh, Phoenix, Ariz.;

Francesco Carobolante, San Jose, Calif. --

Signed and Sealed this

Twenty-third Day of November, 1993

*Attest:*

BRUCE LEHMAN

*Attesting Officer*     *Commissioner of Patents and Trademarks*